United States Patent
Seong et al.

(10) Patent No.: US 7,636,138 B2
(45) Date of Patent: Dec. 22, 2009

(54) BACKLIGHT UNIT AND LIQUID CRYSTAL DISPLAY EMPLOYING THE SAME, COMPRISING AT LEAST ONE BARRIER RIB BETWEEN POINT LIGHT SOURCES, SUBSTANTIALLY INSERTED INTO A DIFFUSION PLATE

(75) Inventors: Ki-bum Seong, Anyang-si (KR); Tae-hee Cho, Seoul (KR); Jong-min Wang, Seongnam-si (KR); Jin-kyoung Oh, Seoul (KR); Su-gun Kim, Hwaseong-si (KR); Il-yong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 11/431,013

(22) Filed: May 10, 2006

(65) Prior Publication Data
US 2006/0256256 A1    Nov. 16, 2006

(30) Foreign Application Priority Data
May 10, 2005    (KR) ............... 10-2005-0039002

(51) Int. Cl.
*G02F 1/1335* (2006.01)
*F21V 7/04* (2006.01)

(52) U.S. Cl. .............. 349/62; 349/64; 349/65; 349/66; 362/610; 362/613

(58) Field of Classification Search ........... 349/62–65, 349/58–60, 70
See application file for complete search history.

(56) References Cited

U.S. PATENT DOCUMENTS

| | | | |
|---|---|---|---|
| 4,978,952 A * | 12/1990 | Irwin ..................... 345/102 |
| 5,390,276 A * | 2/1995 | Tai et al. .................. 385/146 |
| 6,590,626 B1 * | 7/2003 | Suzuki et al. ............ 349/70 |
| 6,947,104 B2 * | 9/2005 | Yu et al. .................. 349/61 |
| 2004/0174717 A1 | 9/2004 | Adachi et al. | |
| 2005/0007516 A1 | 1/2005 | Hong et al. | |

FOREIGN PATENT DOCUMENTS

| | | |
|---|---|---|
| EP | 1327904 A2 | 7/2003 |
| JP | 10-39300 A | 2/1998 |
| JP | 2004-319458 A | 11/2004 |
| KR | 10-2004-0084976 A | 10/2004 |

* cited by examiner

*Primary Examiner*—Michael H Caley
*Assistant Examiner*—Paisley L Arendt
(74) *Attorney, Agent, or Firm*—Sughrue Mion, PLLC

(57) ABSTRACT

A backlight unit and an LCD employing the backlight unit are provided. The backlight unit includes: a base substrate; a plurality of point light sources arranged in two or more lines on the base substrate; a diffusion plate disposed over the plurality of point light sources to diffuse and transmit incident light; and at least one barrier rib forming two or more division areas by being disposed between the base substrate and the diffusion plate to be upright with respect to the base substrate between the lines and having a wall surface reflecting light incident from the plurality of point light sources, at least a portion of an end portion of the barrier rib being inserted into the diffusion plate.

17 Claims, 4 Drawing Sheets

LED LIGHT SEQUENTIAL ON·

FRAME (TIME)

BACKLIGHT UNIT AND LIQUID CRYSTAL DISPLAY EMPLOYING THE SAME, COMPRISING AT LEAST ONE BARRIER RIB BETWEEN POINT LIGHT SOURCES, SUBSTANTIALLY INSERTED INTO A DIFFUSION PLATE

CROSS-REFERENCE TO RELATED PATENT APPLICATION

This application claims priority from Korean Patent Application No. 10-2005-0039002, filed on May 10, 2005, in the Korean Intellectual Property Office, the disclosure of which is incorporated herein in its entirety by reference.

BACKGROUND OF THE INVENTION

1. Field of the Invention

The present invention relates to a backlight unit and a liquid crystal display employing the same and, more particularly, to a direct light type backlight unit having a sequential division lighting structure of division areas, and a liquid crystal display employing the same.

2. Description of the Related Art

A liquid crystal display (LCD), which is a type of flat panel display, is a light receiving type display that is not self-luminescent but forms an image using incident light from an outside source. A backlight unit is disposed at a rear of the LCD to irradiate light toward a liquid crystal panel.

A cold cathode fluorescence lamp (CCFL) is generally used as a light source of the backlight unit of the LCD. However, the CCFL has a comparatively short lifetime and a low color reproducibility. The CCFL is much more disadvantageous with respect to lifetime and color reproducibility than a light emitting diode (LED) and is also more disadvantageous in instant lighting than an LED.

Since the CCFL is poor at instant lighting, it is difficult to employ a backlight unit using the CCFL as a light source in a time-division LCD. The time-division LCD requires a backlight unit that can be division lighted to synchronize with a picture scanning time. A backlight unit using an LED as a light source can satisfy such a requirement.

The backlight units are generally classified, depending on the arrangement of light source, into direct light type backlight units in which light emitted from a plurality of light sources disposed right below a liquid crystal panel is irradiated toward the liquid crystal panel, and edge light type backlight units in which light emitted from a light source disposed on a sidewall of a light guide panel (LGP) is transmitted to a liquid crystal panel.

The direct light type backlight units may use, for example, an LED as a point light source. In the direct type backlight unit using the LED as a point light source, LEDs are arranged in a two-dimensional array. Especially, the LEDs are arranged in plural lines, each line having a plurality of LEDs arranged in a line.

The direct light type backlight unit using the LEDs as a light source can be used in a time-division LCD. Such a direct light type backlight unit is provided with a diffusion plate for diffusing light diverging from the LEDs to irradiate the diffused light toward a liquid crystal panel.

In the time-division LCD employing the direct light type backlight unit using the LEDs as a light source, the lighting areas of the LEDs are divided and the lighting areas of the LEDs are lighted in synchronization with a scan time of the liquid crystal panel.

However, in a case where light diverging from a selected one of the divided lighting areas invades an adjacent lighting area through the diffusion plate, when one picture is changed to another one, it is difficult to effectively remove the motion blur phenomenon such that an after-image remains.

SUMMARY OF THE INVENTION

The present invention provides a backlight unit that can effectively remove the motion blur phenomenon by eliminating light interference between division areas of the backlight unit in a selected area where it is desired to display an image when a light source is lighted in synchronization with a scanning time of a liquid crystal panel, and an LCD employing the backlight unit.

According to an aspect of the present invention, there is provided a backlight unit including: a base substrate; a plurality of point light sources arranged in two or more lines on the base substrate; a diffusion plate disposed on the plurality of point light sources to diffuse and transmit incident light; and at least one barrier rib forming two or more division areas by being disposed between the base substrate and the diffusion plate to be upright with respect to the base substrate between the lines and having a wall surface reflecting light incident from the plurality of point light sources, at least a portion of an end portion of the barrier rib being inserted into the diffusion plate.

The end portion of the barrier rib may be shaped in a triangle.

The two or more lines defined by the plurality of point light sources may be sequentially lighted at a predetermined time interval.

The plurality of point light sources arranged on each of the two or more lines may include red, green and blue light sources.

The plurality of point light sources may be a light emitting diode (LED) or an organic LED (OLED).

According to another aspect of the present invention, there is provided a liquid crystal display (LCD) including a liquid crystal panel and a backlight unit disposed at a rear of the liquid crystal panel to irradiate light toward the liquid crystal panel wherein the backlight unit includes the elements of the above backlight unit.

Each of the two or more lines may be lighted in synchronization with a screen scanning time of the liquid crystal panel.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

The present invention will now be described more fully with reference to the accompanying drawings, in which exemplary embodiments of the invention are shown.

Figure 1:
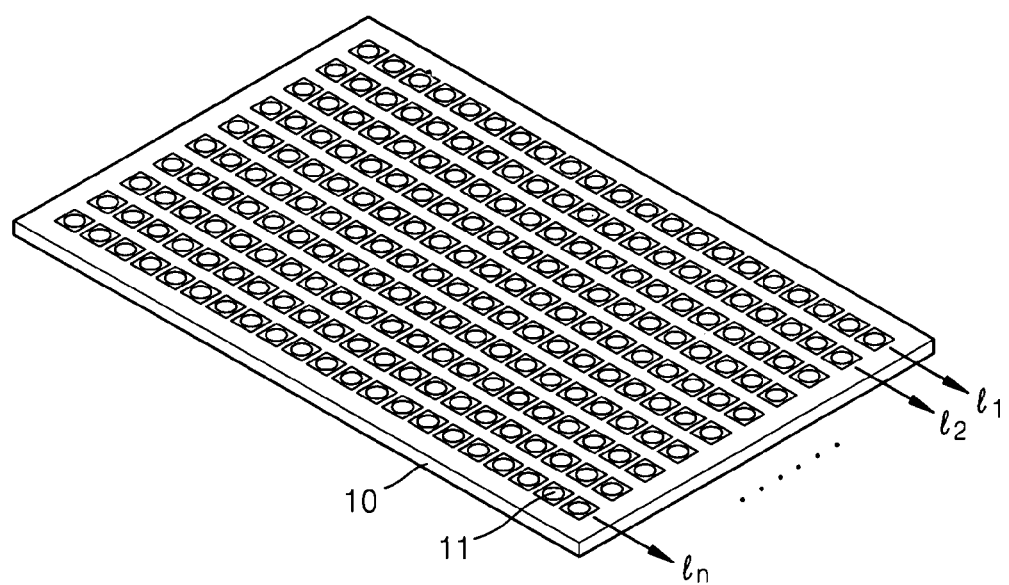
FIG. 1 is a perspective view of a base substrate of a direct light type backlight unit consistent with the present invention.
Figure 2:
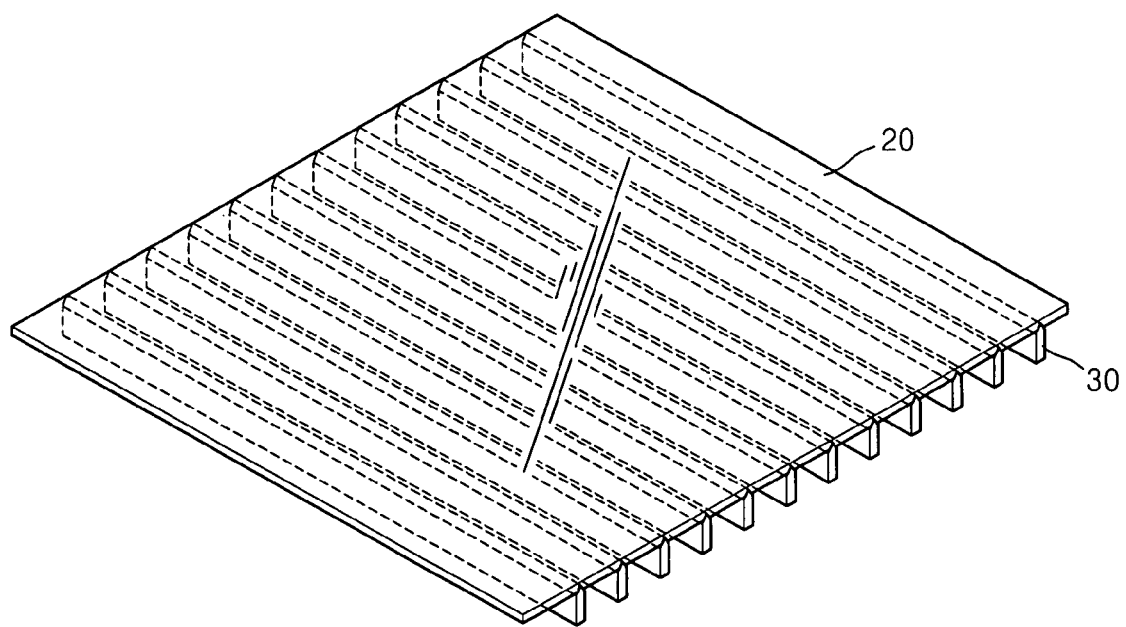
FIG. 2 is a perspective view of a diffusion plate of a direct light type backlight unit consistent with the present invention.
Figure 3:
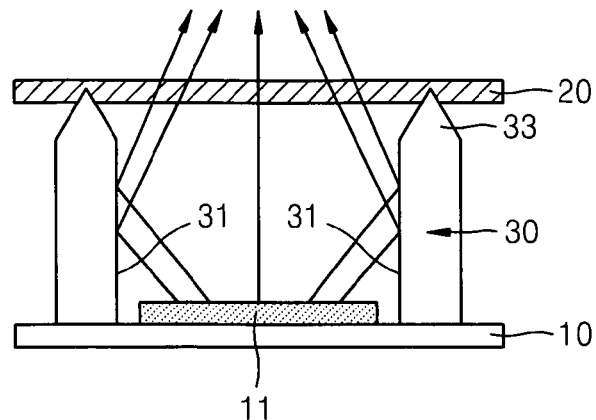
FIG. 3 is a side view of a single division area of a direct light type backlight unit consistent with the present invention.

FIG. 1 is a perspective view of a base substrate of a direct light type backlight unit according to the present invention, FIG. 2 is a perspective view of a diffusion plate of a direct light type backlight unit according to the present invention, and FIG. 3 is a side view of a single division area of a direct light type backlight unit according to the present invention.

Referring to FIGS. 1 and 2, the direct light type backlight unit according to the present invention includes: a base substrate 10; a plurality of point light sources 11 arranged in two or more lines on the base substrate 10; a diffusion plate 20 disposed on the plurality of point light sources 11 to diffuse and transmit incident light such that uniform light is outputted; and one or more barrier ribs 30 between the base substrate 10 and the diffusion plate 20 to form two or more division areas.

The point light source 11 may be, for example, a light emitting device chip, such as an organic light emitting diode (OLED) or a light emitting diode (LED).

Compared with a linear light source using a CCFL, the point light source 11 using the OLED or LED is more advantageous in color reproducibility, lifetime and the like. Especially, since the point light source 11 can be instantly lighted, it is possible that the point light source flickers in synchronization with a scanning time of an LCD.

The plurality of point light sources 11 are arranged in an array of two or more lines on the base substrate 10. In other words, the plurality of point light sources 11 are arranged in n lines $l_1$-$l_n$.

The number of the lines can be properly selected depending on the size of a liquid crystal panel in which the backlight unit of the present invention is being used. For example, in the case of a 26 inch LCD TV, pixels of 768 lines are arranged in a vertical direction. So, when the backlight unit is designed such that all point light sources on each line light pixels of 7 lines, the point light sources of total lines can use 110 lines.

The plurality of point light sources 11 arranged on each line may be constructed such that three kinds of light sources respectively emitting red (R), green (G) and blue (B) lights are mixed to emit white light. Also, each of the plurality of point light sources 11 includes an RGB multi-chip light source, for example, an RGB multi-chip LED light source.

Referring to FIGS. 2 and 3, the barrier ribs 30 are disposed between the base substrate 10 and the diffusion plate 20 such that they stand upright with respect to the base substrate 10 between the lines, thereby forming a plurality of division areas.

Each of the barrier ribs 30 has a sidewall surface 31 to reflect light incident from the light sources 11, and is designed to have at least a portion of one end 33 thereof inserted into the diffusion plate 20. The barrier ribs 30 are arranged in parallel with each line between the lines of light sources 11.

It is preferable, but not necessary, that the sidewall surface 31 be a reflection surface so as to reflect the light incident from the light sources 11 as much as possible and progress the reflected light toward the diffusion plate 20. The sidewall surface 31 may be formed into a reflection surface by attaching a reflection sheet thereon or coating a reflection film thereon.

As shown in FIG. 2, the barrier ribs 30 can be coupled with the diffusion plate 20 in a state that a part of the one end 33 thereof is inserted into the diffusion plate 20. At this point, the diffusion plate 20 has an insertion groove into which a part of the one end 33 of each of the barrier ribs 30 is inserted. Alternatively, it may be designed that the barrier ribs 30 are installed vertically on the base substrate 10 and a part of the one end 33 of each of the barrier ribs 30 is inserted into the insertion groove of the diffusion plate 20.

Figure 4A:
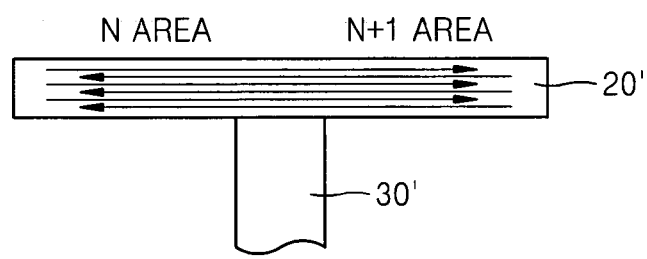
FIG. 4A is a comparative example, which shows travels of light within a diffusion plate when a barrier rib is not inserted but stands vertically.
Figure 4B:
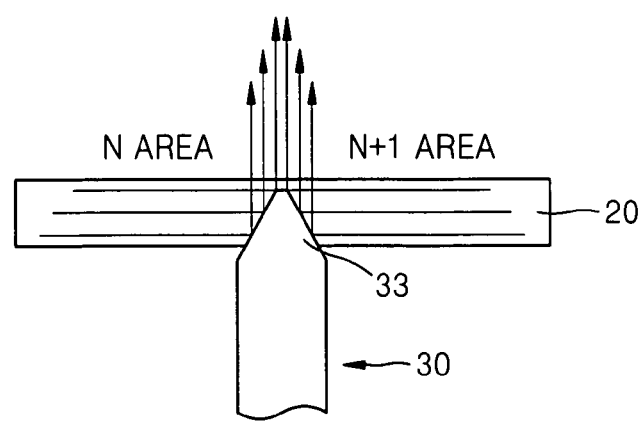
FIG. 4B is a schematic view showing travels of light within a diffusion plate consistent with the present invention.

FIG. 4A is a comparative example, which shows travels of light within a diffusion plate 20' when a barrier rib 30' is not inserted but is attached vertically, and FIG. 4B shows travels of light within a diffusion plate 20 according to the present invention.

As shown in FIG. 4A, although there is a barrier rib 30' defining division areas, light interference may take place at adjacent division areas of area N and area N+1 through a diffusion plate 20'.

However, as shown in FIG. 4B, according to the present invention, since at least a part of one end 33 of the barrier rib 30 is inserted into the diffusion plate 20, light interference between the adjacent division areas of area N and area N+1 through the diffusion plate 20 can be prevented.

It is preferable, but not necessary, that the part of one portion 33 of the barrier ribs 30 be configured to prevent light interference between adjacent division areas as much as possible without generating a dark portion. For this purpose, as shown in FIGS. 2, 3 and 4B, it is preferable, but not necessary, that the one end 33 have an acute triangle structure. At this time, the triangle structure may be variously modified.

In addition, it is preferable that the one end 33 be a reflection surface so as to reflect light diverging through the diffusion plate 20 and progress the reflected light in an upward direction of the diffusion plate 20.

For example, the one end 33 of the barrier rib 30 can be made into a reflection surface by enclosing a reflection sheet thereon or coating a reflection film thereon.

According to the aforementioned structure of the barrier rib 30, the backlight unit is divided into a plurality of lighting areas, so that it can be prevented that light emitted from one lighting area is diffused into an adjacent light area through the diffusion plate 20.

The above backlight unit according to the present invention, for example, is divided into N horizontal division areas by the N lines defined by the plurality of point light sources 11 and (N−1) barrier ribs 30 disposed between the N lines, thereby preventing light interference between adjacent division areas. At this time, the N lines can be sequentially lighted at a predetermined time interval without light interference between adjacent division areas.

Accordingly, by using the backlight unit according to the present invention, light interference in the backlight unit which is divided into N division areas and is sequentially lighted in a group of the divided lines during a scanning time of an LCD can be prevented, thereby eliminating image display error due to light interference.

Figure 5:
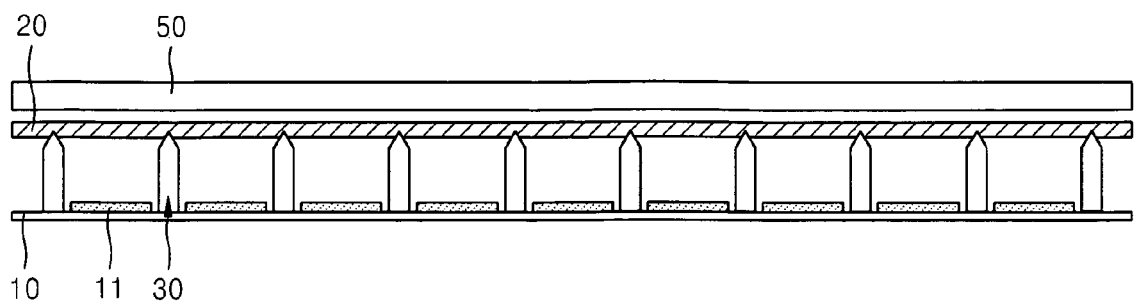
FIG. 5 is a schematic view of an LCD having a backlight unit consistent with the present invention.

FIG. 5 is a schematic view of an LCD having a backlight unit according to the present invention.

Referring to FIG. 5, the LCD includes a liquid crystal panel 50 and a backlight unit disposed at a rear of the LCD 50 to irradiate light toward the liquid crystal panel 50.

As well known to those skilled in the art, the liquid crystal panel 50 allows light linearly polarized in one direction to be incident into a liquid crystal layer of the liquid crystal panel 50, and the direction of liquid crystal director to be changed by an electric field operation, thereby changing polarization of light passing through the liquid crystal layer to display image information. The liquid crystal panel 50 can include all kinds of liquid crystal panels. Since the various structures for the liquid crystal panel 50 are well known to those skilled in the art, their detailed description and illustration will be omitted.

As described above referring to FIGS. 1 through 4B, the backlight unit according to the present invention has a structure in that a plurality of light sources 11 are arranged in two or more lines on a base substrate 10, a diffusion plate 20 is disposed in parallel with the base substrate 10, the at least one barrier rib 30 is arranged vertically on the base substrate 10 to be located between lines, and at least a portion of one end 33 of the barrier rib 30 is inserted into the diffusion plate 20.

The operation of the backlight unit according to the present invention will now be described in more detail.

Figure 6A:
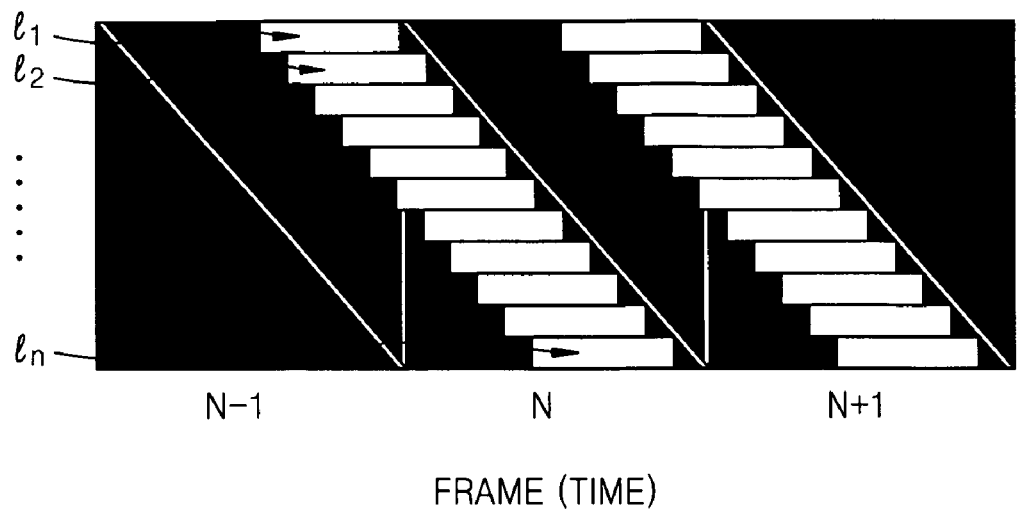
FIG. 6A is a schematic view exemplarily showing a division lighting driving method of a light source in a backlight unit consistent with the present invention.
Figure 6B:
FIG. 6B is a schematic view exemplarily showing a division lighting state of a light source in a backlight unit consistent with the present invention.

FIG. 6A is a schematic view exemplarily showing a division lighting driving method of a light source in a backlight unit according to the present invention, and FIG. 6B is a schematic view exemplarily showing a division lighting state of a light source in a backlight unit according to the present invention.

In FIG. 6A, a horizontal axis represents a picture frame, i.e., time, and a vertical axis represents lines of the backlight unit. Typically, an image of one frame in an LCD TV is sequentially scanned from an upper portion of a screen of the LCD TV to a lower portion and an image of next frame starts to be scanned before the lower portion of the previous frame is completely scanned. In the case of the conventional backlight unit using the CCFL, since the entire area of the liquid crystal panel is always lighted regardless of the scanning sequence, it fails to effectively remove the motion blur phenomenon. Unlike in the conventional backlight unit, since a plurality of lines $l_1$-$l_n$ defined by a plurality of point light sources are sequentially and selectively lighted at a predetermined time interval for each line in synchronization with the scanning time of the liquid crystal panel, the motion blur can be effectively removed.

That is, as shown in FIG. 6A, in the moment that an N-th frame image on an upper portion of the liquid crystal panel is scanned, the point light sources on a first line ($l_1$) are lighted. After a predetermined time delay depending on the scanning time of the liquid crystal panel, the point light sources on a second line ($l_2$) are lighted. In this way, the point light sources are sequentially lighted until an n-th line ($l_n$), so that the lighting of the backlight unit for the N-th frame image is completed. At this time, the point light sources on each line are again not lighted after a predetermined amount of time elapse, and are then again lighted for a next frame image. In other words, it is controlled that the point light sources on the respective lines repeat lighting and not lighting at a predetermined period and the point light sources on any line are lighted after a predetermined time delay since the point light sources on a previous line are lighted. The lighted and unlighted period of the respective lines and the lighted and unlighted delay time between adjacent lines are determined depending on a vertical scanning frequency of the liquid crystal panel and the number of the light source lines.

Thus, according to the present invention, since the light source lines are sequentially and selectively lighted at a predetermined period, the backlight unit at an arbitrary time is not wholly lighted but is partly lighted as shown in FIG. 6B.

Since it is required that the backlight unit be partly lighted at a selected time, it is necessary to prevent the light emitting from a lighted area from dispersing into an adjacent area. In other words, the light emitting from the point light sources of one line does not have to disperse into an area for an adjacent line. In the backlight unit according to the present invention, the barrier ribs 30 prevent light from dispersing into an adjacent area. Further, by inserting at least a portion of one end 33 of each of the barrier ribs 30 into the diffusion plate 20, the light is prevented from dispersing into an adjacent area through the diffusion plate 20.

Thus, by employing the structure of the barrier rib 30, since the lighting area of the backlight unit can be divided into plural areas selectively lighted and the light emitted from the divided lighting area can be prevented from invading an adjacent divided area through the diffusion plate 20, it is possible to exactly irradiate the light of the backlight unit of the divided area, thereby performing a display using impulse light, like in a CRT to effectively remove the motion blur phenomenon. Furthermore, picture brightness and light uniformity in a lighted area are enhanced, so that contrast is greatly enhanced.

The aforementioned backlight unit according to the present invention can be used as a backlight unit for an LCD operating in 60 Hz, for example, an LCD TV. At this time, the backlight unit can solve the motion blur phenomenon, which is most serious problem in the LCD.

As described above, according to the backlight unit of the present invention, when point light sources are lighted in synchronization with a scanning time of a liquid crystal panel, light interference between adjacent division areas of the backlight unit in a predetermined area for display can be eliminated, thereby effectively removing the motion blur phenomenon.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight unit comprising:
   a base substrate;
   a plurality of point light sources arranged in two or more lines on the base substrate;
   a diffusion plate disposed over the plurality of point light sources to diffuse and transmit incident light; and
   at least one barrier rib forming two or more division areas by being disposed between the base substrate and the diffusion plate to be upright with respect to the base substrate between the lines and having a wall surface reflecting light incident from the plurality of point light sources, at least a portion of an end portion of the barrier rib being substantially inserted into the diffusion plate.

2. The backlight unit of claim 1, wherein the end portion of the barrier rib is shaped in a triangle.

3. The backlight unit of claim 2, wherein the two or more lines defined by the plurality of point light sources are sequentially lighted at a predetermined time interval.

4. The backlight unit of claim 1, wherein the two or more lines defined by the plurality of point light sources are sequentially lighted at a predetermined time interval.

5. The backlight unit of claim 1, wherein the plurality of point light sources arranged on each of the two or more lines comprise red, green and blue light sources.

6. The backlight unit of claim 1, wherein the plurality of point light sources are an LED (light emitting diode) or an OLED (organic LED).

7. An LCD (liquid crystal display) comprising a liquid crystal panel and a backlight unit disposed at a rear of the liquid crystal panel to irradiate light toward the liquid crystal panel, wherein the backlight unit comprises:

a base substrate;

a plurality of point light sources arranged in two or more lines on the base substrate;

a diffusion plate disposed over the plurality of point light sources to diffuse and transmit incident light; and at least one barrier rib forming two or more division areas by being disposed between the base substrate and the diffusion plate to be upright with respect to the base substrate between the lines and having a wall surface reflecting light incident from the plurality of point light sources, at least a portion of an end portion of the barrier rib being substantially inserted into the diffusion plate.

8. The LCD of claim 7, wherein the end portion of the barrier rib is shaped in a triangle.

9. The LCD of claim 8, wherein the two or more lines defined by the plurality of point light sources are sequentially lighted at a predetermined time interval.

10. The LCD of claim 7, wherein the two or more lines defined by the plurality of point light sources are sequentially lighted at a predetermined time interval.

11. The LCD of claim 7, wherein the plurality of point light sources arranged on each of the two or more lines comprise red, green and blue light sources.

12. The LCD of claim 7, wherein the plurality of point light sources are an LED (light emitting diode) or an OLED (organic LED).

13. The LCD of claim 7, wherein each of the two or more lines is lighted in synchronization with a screen scanning time of the liquid crystal panel.

14. The backlight unit of claim 1, wherein the at least one barrier rib is disposed between the lines of point light sources, dividing the plurality of point light sources into two or more light areas.

15. The LCD of claim 7, wherein the at least one barrier rib is disposed between the lines of point light sources, dividing the plurality of point light sources into two or more light areas.

16. The backlight unit of claim 1, wherein the at least one barrier rib is disposed entirely between adjacent lines of point light sources.

17. The LCD of claim 7, wherein the at least one barrier rib is disposed entirely between adjacent lines of point light sources.

* * * * *